(No Model.)
G. S. FOLLANSBEE.
WATER METER.
No. 327,155. Patented Sept. 29, 1885.
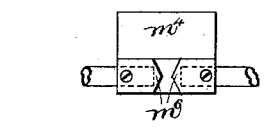
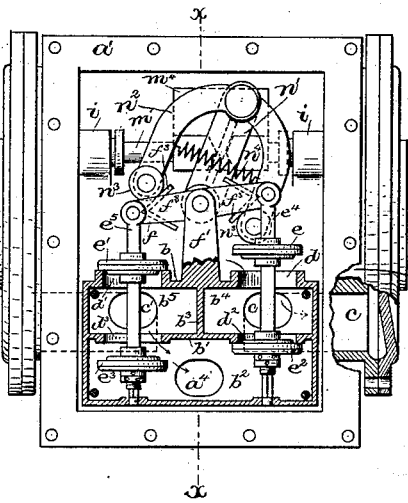
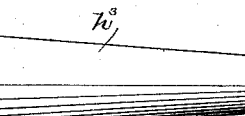
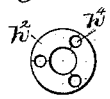
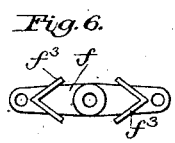
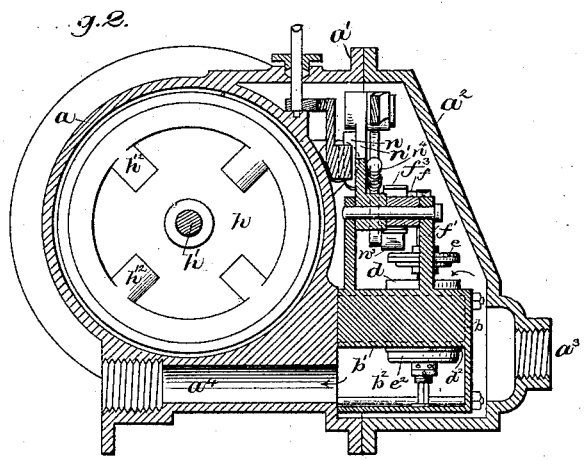
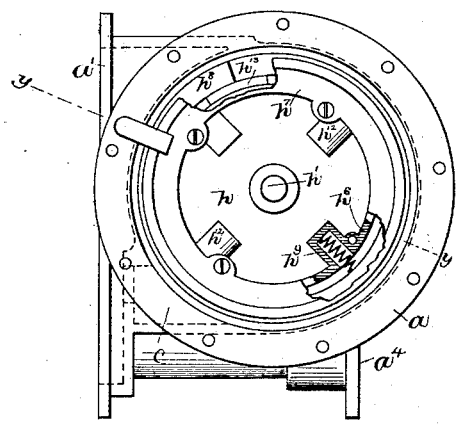
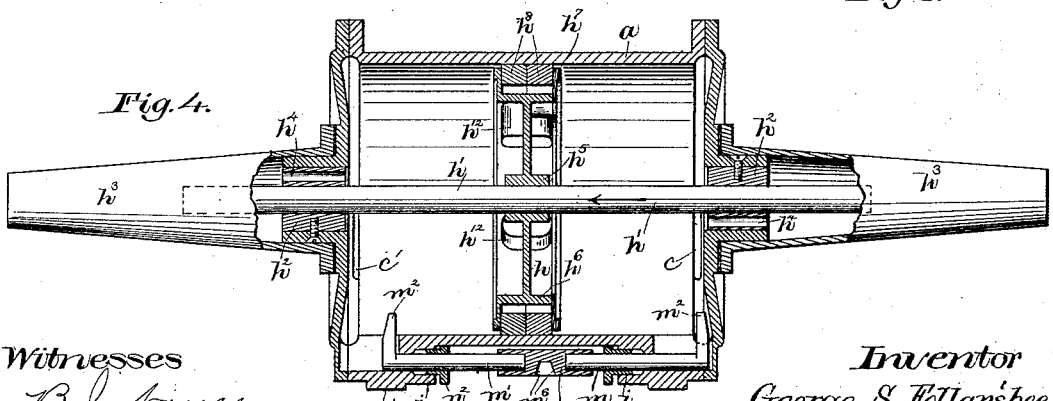
Witnesses
B. J. Noyes
W. H. Sigston
Inventor
George S. Follansbee
by Crosby & Gregory
Att'ys.

UNITED STATES PATENT OFFICE.

GEORGE S. FOLLANSBEE, OF BOSTON, MASSACHUSETTS.

WATER-METER.

SPECIFICATION forming part of Letters Patent No. 327,155, dated September 29, 1885.

Application filed July 21, 1884. (No model.)

*To all whom it may concern:*

Be it known that I, GEORGE S. FOLLANSBEE, of Boston, county of Suffolk, State of Massachusetts, have invented an Improvement in Water-Meters, of which the following description, in connection with the accompanying drawings, is a specification, like letters on the drawings representing like parts.

My invention relates to a fluid meter or motor of that class known as "piston-meters," in which the fluid passing through the apparatus actuates a piston which may be employed in the case of a motor to actuate other mechanism, or which, as shown in the present instance, is employed merely to actuate registering mechanism, showing the number of movements of the said piston or the number of times that the cylinder has been filled by the fluid, so as to indicate the total volume of fluid that has passed through the apparatus.

The invention consists, mainly, in details of construction of the cylinder and piston, and passages through which the fluid is conveyed to and from the said cylinder at opposite sides of the piston alternately, and in the construction and operation of the valves controlling the flow of fluid through the said passages, and mechanism by which the said valves are actuated at the end of each stroke of the piston. The valves are of the class known as "puppet-valves," moving toward and from their seats to cover or uncover the openings therein. The valve-actuating mechanism is of such construction that the valves remain stationary during the stroke of the piston, and just at the end of the said stroke are moved suddenly in order to immediately reverse the direction of the flow of the liquid, it flowing into the end of the cylinder from which it was being discharged during the previous stroke and flowing out from the end of the cylinder which was filled at the previous stroke.

Figure 1 is a side elevation, partly in section, of a meter embodying this invention, the cover of the valve-chest being removed, and a portion of the valve mechanism and of the cylinder shown in section. Fig. 2 is a section thereof on line $x\ x$, Fig. 1; Fig. 3, an end elevation of the cylinder with one of the cylinder-heads removed, showing the piston; Fig. 4, a longitudinal section on line $y\ y$, Fig. 3; and Figs. 5, 6, and 7 details to be referred to.

The cylinder $a$ has at one side of it a flange, $a'$, to which is connected a case or cover, $a^2$, inclosing a space between it and the side of the cylinder, which space will be called the "valve chest or chamber," it containing the valves and their operating mechanism. The said cover $a^2$ is provided with an inlet-opening, $a^3$, and the cylinder with an outlet-opening or passage, $a^4$, for the fluid to be measured, the said openings $a^3\ a^4$ being screw-threaded or otherwise adapted to be connected with the pipes through which the fluid passes.

The valve-chest contains an internal chest, $b$, divided by a partition, $b'$, into separate chambers, one of which, $b^2$, communicates with the outlet-passage, $a^4$, while the other is divided by a partition, $b^3$, into two chambers, $b^4\ b^5$, communicating through ports or passages $c\ c'$ with the opposite ends of the cylinder $a$. The inlet-chambers $b^4\ b^5$ are provided with inlet-openings $d\ d'$ leading from the valve-chest, and the said chambers are provided with outlet-openings $d^2\ d^3$ leading to the outlet-chamber $b^2$. The flow of the fluid through the said openings $d\ d'\ d^2\ d^3$ is controlled by valves $e\ e'\ e^2\ e^3$, the valves $e\ e^2$ controlling the openings of the chamber $b^4$, being connected with a stem, $e^4$, and the valves $e^2\ e^3$ controlling the openings of the chamber $b^5$ being connected with a stem, $e^5$, and the stems $e^4\ e^5$ being connected with opposite ends of a lever, $f$, pivoted on an upright, $f'$, from the chamber $b$. The valve-stems $e^4\ e^5$ are guided in their movement by stationary pins $e^6$ entering longitudinal passages in the lower end of the said stem.

When the said lever $f$ is in the position shown in Fig. 1, with the stem $e^4$ raised and the stem $e^5$ depressed, the valves $e\ e^3$ are open, thus admitting fluid to the chamber $b^4$ and through the port $c$ to the adjacent end of the cylinder, and discharging fluid from the chamber $b^5$ and end of the cylinder connected therewith by the port $c'$ into the chamber $b^2$, and thence through the outlet-passage $a^4$, while the valves $e'\ e^2$ are closed, thus preventing the ingress of fluid from the valve-chamber to the chamber $b^5$, and the egress of fluid from the chamber $b^4$ directly to the chamber $b^2$ and outlet $a^4$. It will be seen that the pressure of the incoming fluid is on the upper surface of the valve $e'$, and also on the upper surface of the valve $e^3$, and as the said valves are connected through the lever $f$ the pressure on the said valves balances, producing no tendency to move the said valves or to resist their movement, and likewise the back pressure on the valves $e^2$ and $e'$ is equal and balanced. If the lever $f$ were rocked on its pivot to the opposite inclination, the valves $e'$ and $e^2$ would be opened and the valves $e$ $e^3$ closed, thus admitting fluid to the chamber $b^5$ and adjacent end of the cylinder and discharging it from the chamber $b^4$ and adjacent end of the cylinder.

When the valves are in the position shown in Fig. 1, admitting fluid through the chamber $b^4$ and port $c$ to the adjacent end of the cylinder, the said fluid will act upon the piston $h$, causing it to move through the cylinder in one direction, pressing the fluid out from the cylinder at the other side thereof, through the port $c'$ and chamber $b^5$; and when the said piston reaches the end of the cylinder it is necessary for the proper operation that the position of the valves should be reversed, so that the piston may be forced back in the opposite direction to discharge the fluid that has just been acting upon it. The position of the valves is thus reversed by the valve-actuating mechanism, which will now be described. The cylinder is provided with passages $i$, containing slide-rods $m$ $m'$, having projections $m^2$ within the cylinder in position to be engaged by the piston when it arrives near the end of the cylinder, after which engagement the said rods will be moved longitudinally by the piston in completing its stroke.

The rods $m$ $m'$ are connected with a block, $m^4$, (see Fig. 5,) in the valve-chamber, having projections $m^6$ engaging the opposite sides of a rib, $n$, (see Fig. 2,) on a rocking arm, $n'$, pivoted concentrically with the lever $f$, with which the valve-stems are connected. The said arm $n'$ has pivoted upon it the valve-actuating arms $n^2$, provided at their free ends with rollers $n^3$, resting upon inclined or V-shaped cam-surfaces $f^3$ on the rear side of the lever $f$. (See Fig. 6). The arms $n^2$ are drawn toward one another, keeping the rollers pressed against the surfaces $f^3$ by means of a spring, $n^4$. When the piston $h$ arrives near the end of its stroke, it engages the projection $m^2$, moving it toward the end of the cylinder, and thus through the projections $m^6$ of the block $m^4$ rocks the lever $n'$ on its pivot, and causes the rollers $n^3$ to move along the V-shaped surfaces $f$ upon which they are resting, such movement separating the arms $n^2$ and straining the spring $n^4$ until the moment when the rollers $n^3$ pass the points of the V-shaped surfaces $f^3$, when the said rollers will bear on the other sides of the V-shaped surfaces, and the pressure of the spring $n^4$, drawing the arms $n^2$ toward one another, will cause the rollers to act on the V-shaped surfaces, turning the lever $f$ on its pivot, and thus reversing the position of each of the valves $e$ $e'$ $e^2$ $e^3$ with relation to the passage controlled by it. The final movement of the valves by which the direction of the flow of fluid is reversed is thus produced by the action of the spring $n^4$, and takes place very suddenly, being wholly independent of the speed at which the piston is moving, and of the further movement of the said piston.

The piston $h$ is fixed on a rod, $h'$, (best shown in Fig. 4,) which serves to steady and guide it in its movements through the cylinder, the said rod working in guides or bearings $h^2$ (see Fig. 7) in the cylinder-heads, and the ends of the rod entering long pockets or chambers $h^3$ connected with the cylinder-heads. The guide pieces or bearings $h^2$ are composed of blocks of suitable material, lignum-vitæ being well adapted for this use, as it produces but little friction and wears very slowly, and the blocks $h^2$ have passages $h^4$ (see Fig. 7) to permit the liquid displaced from the pockets $h^3$ by the rod $h'$ to enter the cylinder and escape therefrom through the outlet-passage. The said blocks are divided longitudinally into several segments to provide for swelling without binding on the rod $h'$, and the different segments are connected with the cylinder-head by screws, as shown in Fig. 3.

The piston $h$ consists, essentially, of a metal disk having a boss or hub, $h^5$, to give sufficient bearing for rigid connection with the rod $h'$, and a flange, $h^6$, at some distance from the walls of the cylinder, the said flange having connected with its edges metal rings $h^7$, between which are held packing-rings $h^8$, which may be composed of circular strips of lignum-vitæ pressed outward into contact with the walls of the cylinder by springs $h^9$, contained in pockets $h^{12}$, forming a part of the casting or piece $h$, which constitutes the main portion of the piston. One of the said pockets is shown in section in Fig. 3, and a portion of the ring $h^7$ is broken away, showing the joint or space at the meeting ends of one of the packing-rings $h^8$, which forms a complete circle except at this point. The joint of the other packing-ring will be nearly at the opposite side of the piston, and blocks $h^{13}$ (see Fig. 3) are placed under the joints to prevent the fluid from passing through the said joint into the space between the rings and the flange $h^6$. A piston constructed in this manner is very tight, and will operate for a long time and with but very little wear.

The seats of the valves are raised, as shown, or project beyond the surface surrounding them to prevent the lodging of sand or other sediment upon them, and the valves themselves are faced with rubber or other suitable material.

The block $m'$ is provided at its rear side with suitable devices for engaging and operating a shaft, O, which may actuate registering mechanism of any suitable or usual kind. As herein shown, the said block is provided with a rack engaging a pinion on the said shaft, which is thus oscillated at each movement of the valve-gear or at each stroke of the piston; but it is obvious that the registering mechanism might be actuated by any other moving part of the apparatus.

I claim—

1. The cylinder and piston therein, and the valves and rocking lever connected therewith having cam-surfaces combined with the rocking arm actuated by the piston near the end of its stroke, and the valve-actuating arms pivoted on said rocking arm and bearing on said cam-surfaces, substantially as described.

2. The cylinder and piston therein, and the valves and rocking lever connected therewith provided with cam-surfaces combined with the slide-rods having projections within the cylinder near its ends, the rocking arm actuated thereby, and the valve-actuating arms pivoted on said rocking arm and bearing on the said cam-surfaces, substantially as described.

In testimony whereof I have signed my name to this specification in the presence of two subscribing witnesses.

GEO. S. FOLLANSBEE.

Witnesses:
   JOS. P. LIVERMORE,
   B. J. NOYES.